United States Patent
Zhang

(10) Patent No.: US 9,145,922 B2
(45) Date of Patent: Sep. 29, 2015

(54) ROTARY SUPPORT INCLUDING BEARINGS

(71) Applicant: Schaeffler Technologies GmbH & Co. KG, Herzogenaurach (DE)

(72) Inventor: Jianchang Zhang, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/282,620

(22) Filed: May 20, 2014

(65) Prior Publication Data

US 2014/0355918 A1 Dec. 4, 2014

(30) Foreign Application Priority Data

May 31, 2013 (CN) .......................... 2013 1 0215579

(51) Int. Cl.
*F16C 35/06* (2006.01)
*F16C 35/04* (2006.01)
*F16C 19/18* (2006.01)

(52) U.S. Cl.
CPC ............. *F16C 35/042* (2013.01); *F16C 19/181* (2013.01)

(58) Field of Classification Search
CPC ...... F16C 35/042; F16C 35/045; F16C 43/04; F16C 2300/14
See application file for complete search history.

(56) References Cited

U.S. PATENT DOCUMENTS

| 757,824 | A | * | 4/1904 | Martin | 191/66 |
| 2,876,051 | A | * | 3/1959 | Fox | 384/609 |
| 2,895,770 | A | * | 7/1959 | Matthews | 384/617 |
| 5,174,538 | A | * | 12/1992 | Okada | 248/349.1 |
| 5,346,317 | A | * | 9/1994 | Williams | 384/611 |
| 6,568,646 | B2 | * | 5/2003 | Wess et al. | 248/349.1 |
| 2007/0160316 | A1 | * | 7/2007 | Niebling et al. | 384/544 |
| 2009/0052823 | A1 | * | 2/2009 | Komori et al. | 384/454 |
| 2011/0235958 | A1 | * | 9/2011 | Norimatsu | 384/544 |

* cited by examiner

*Primary Examiner* — Thomas R. Hannon
(74) *Attorney, Agent, or Firm* — Antun M. Peakovic

(57) ABSTRACT

A rotary support, comprising: a bearing inner race; a bearing outer race including a plurality of axially disposed through holes; a first plurality of rolling elements installed between the bearing inner race and the bearing outer race, and arranged to retain the bearing inner race and the bearing outer race in rolling engagement; and an outer ring radially surrounding and fixed to an outer portion of the bearing inner race and disposed axially opposite to the bearing outer race; wherein the outer ring includes a plurality of axially penetrating mounting holes; and wherein the bearing outer race through holes are axially aligned with the outer ring mounting holes.

10 Claims, 4 Drawing Sheets

US 9,145,922 B2

ROTARY SUPPORT INCLUDING BEARINGS

FIELD

The invention relates generally to a rotary support, and in particular, to a rotary support including bearings.

BACKGROUND

Referring to FIG. 1, FIG. 1 discloses a rotary support in the prior art. The rotary support includes a bearing inner race 102 and a bearing outer race 100 that is coaxial with and surrounds the bearing inner race 102. Two spaced-apart groups of rolling elements 104 are disposed between the bearing inner race 102 and the bearing outer race 100, in which the bearing inner race 102 and the bearing outer race 100 can rotate relative to each other through the rolling elements 104.

Specifically, multiple threaded holes 103 arranged at equal intervals are disposed in a lower end of the bearing inner race 102. A central axis of the threaded holes 103 is parallel to a central axis of the bearing inner race 102. The threaded holes 103 are used for fixed connection to a first mounting surface of a rotary structure. Multiple threaded holes 101 arranged at equal intervals are disposed in an upper end of the bearing outer race 100. A central axis of the threaded holes 101 is parallel to a central axis of the bearing outer race 100. The threaded holes 101 are used for fixed connection to a second mounting surface of the rotary structure. The first mounting surface and the second mounting surface are opposite in position.

Taking, as a boundary, a plane passing through the center of the rotary support and perpendicular to the central axis, the upper end of the bearing outer race 100 is located on one side of the plane, and the lower end of the bearing inner race 102 is located on the other side of the plane. When the rotary support is mounted to the rotary structure, mounting holes in the first mounting surface are aligned, one by one, with the threaded holes 103 of the bearing inner race 102, rods of bolts are screwed and fixed to the threaded holes 103 through the mounting holes of the first mounting surface, and finally, the bearing inner race 102 is fixedly connected to the first mounting surface, which provides the supporting surface for bolt heads; afterwards, mounting holes of the second mounting surface are aligned, one by one, with the threaded holes 101 of the bearing outer race 100, rods of bolts are screwed and fixed to the threaded hole 101 through the mounting holes of the second mounting surface, and finally, the bearing outer race 100 is fixedly connected to the second mounting surface.

With the aforementioned rotary support, bolts need to be fixedly connected to the threaded holes in the bearing inner race and the bearing outer race through the mounting holes in the first mounting surface and the second mounting surface. However, in some special occasions, there is narrow operating space near the mounting holes of the first mounting surface, so it is hard to lead the bolts into the mounting holes, and there is even no operating space to lead the bolts therein. Or, even if the rods are led into the mounting holes and aligned with the threaded holes, there is no space for a wrench for screwing the bolt heads to reach the bolt heads. Therefore, for occasions in which mounting to the threaded holes in the bearing inner race through the mounting holes of the first mounting surface is inconvenient, the first mounting surface cannot be connected to the rotary support in the opposite direction with the existing rotary support.

BRIEF SUMMARY

The problem to be solved by the present invention is that the existing rotary support cannot be mounted to an external rotary structure when there is limited mounting space at one mounting side.

Example aspects broadly comprise a novel rotary support including: a bearing inner race, a bearing outer race, and multiple rolling elements located between the bearing inner race and the bearing outer race, in which the bearing inner race and the bearing outer race rotate relative to each other through the rolling elements.

Example aspects broadly comprise a rotary support further including: an outer ring surrounding the bearing inner race in a radial direction and connected to the bearing inner race, in which the outer ring is axially opposite to the bearing outer race, multiple axially penetrated mounting holes are disposed in the outer ring, through holes are disposed in the bearing outer race, and the through holes match the mounting holes.

Example aspects broadly comprise, optionally, an annular groove disposed in an end of the bearing outer race axially opposite to the outer ring, and a radial width of the annular groove is greater than a diameter of the mounting holes.

Example aspects broadly comprise, optionally, the multiple rolling elements comprise sets of angular contact thrust bearings.

Example aspects broadly comprise, optionally, the mounting holes are of an even number and are arranged in central symmetry, and the number of the through holes is two and the through holes are arranged at equal intervals.

Example aspects broadly comprise, optionally, the outer ring and the bearing inner race are integrated or in threaded connection.

Example aspects broadly comprise, optionally, an inner diameter of the bearing inner race gradually increases in a direction pointing from the bearing outer race to the outer ring.

Example aspects broadly comprise, optionally, the rotary support further including: a screw race located between the bearing outer race and the bearing inner race, in which the screw race radially surrounds the bearing inner race and is in threaded connection with the bearing inner race.

Other example aspects broadly comprise a rotary support, including: a bearing inner race, a bearing outer race, and multiple rolling elements located between the bearing inner race and the bearing outer race, in which the bearing inner race and the bearing outer race rotate relative to each other through the rolling elements, the bearing inner race is provided with several mounting holes for mounting a first mounting surface, the bearing outer race is provided with several threaded holes for mounting a second mounting surface, and the bearing outer race is provided with through holes axially matching the mounting holes, so that the bearing inner race is mounted to the first mounting surface in a mounting direction of the second mounting surface.

Compared with the prior art, the technical solutions of the present invention have the following advantage: the through holes match the mounting holes, so bolts can enter the mounting holes through the through holes so as to fix the bearing inner race of the rotary support to an external rotary structure.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The following description is made with reference to FIGS. 2-5.

Figure 1:
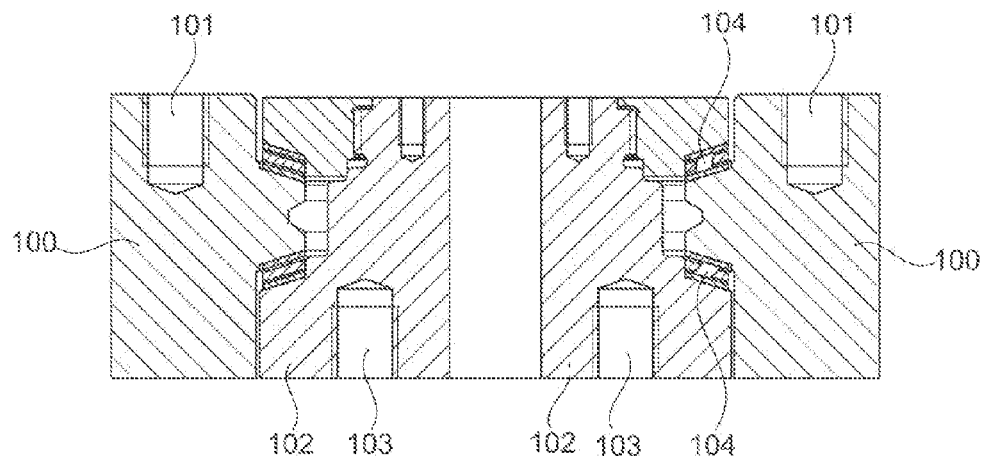
FIG. 1 illustrates a sectional view of a rotary support in the prior art along a plane of central axis.
Figure 2:
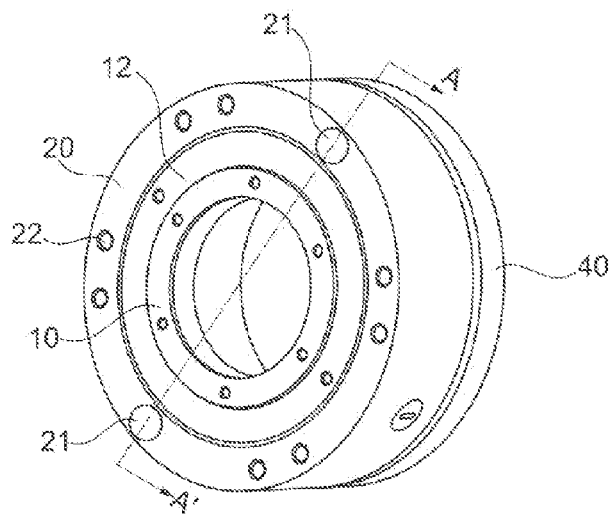
FIG. 2 illustrates a three-dimensional view of a rotary support according to an example aspect.
Figure 3:
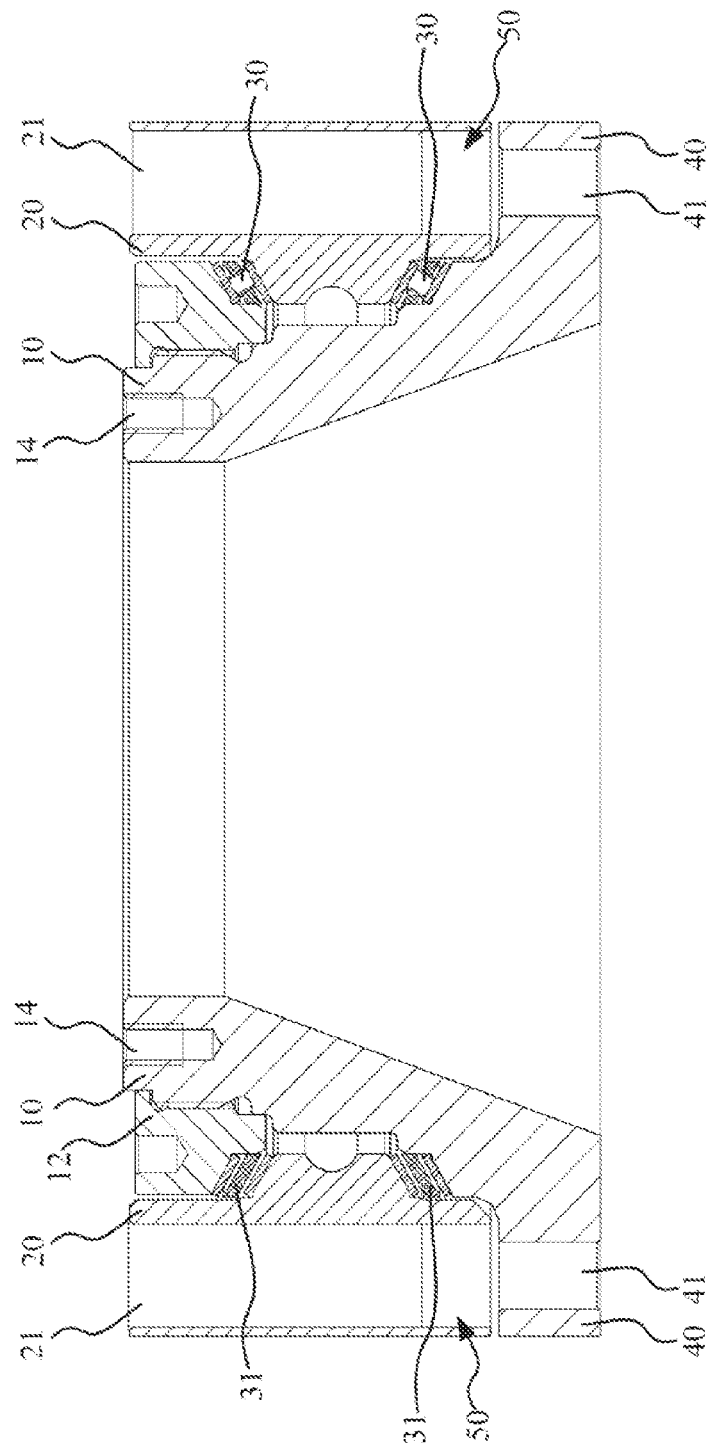
FIG. 3 illustrates a sectional view of the rotary support, according to an example aspect, in the A-A' direction of FIG. 2.

Referring to FIG. 2 and FIG. 3, a rotary support of the present invention includes bearing inner race 10, bearing outer race 20, a plurality of rolling elements 30 located between bearing inner race 10 and bearing outer race 20, and outer ring 40 surrounding bearing inner race 10 in a radial direction and fixedly connected to bearing inner race 10, in which outer ring 40 is axially opposite to bearing outer race 20. In an example aspect, outer ring 40 is fixedly connected to a first mounting surface of an external rotary structure, bearing outer race 20 is fixedly connected to a second mounting surface, the first mounting surface and the second mounting surface drive bearing inner race 10 or bearing outer race 20 to rotate, and bearing inner race 10 and bearing outer race 20 move via rolling elements 30.

Figure 4:
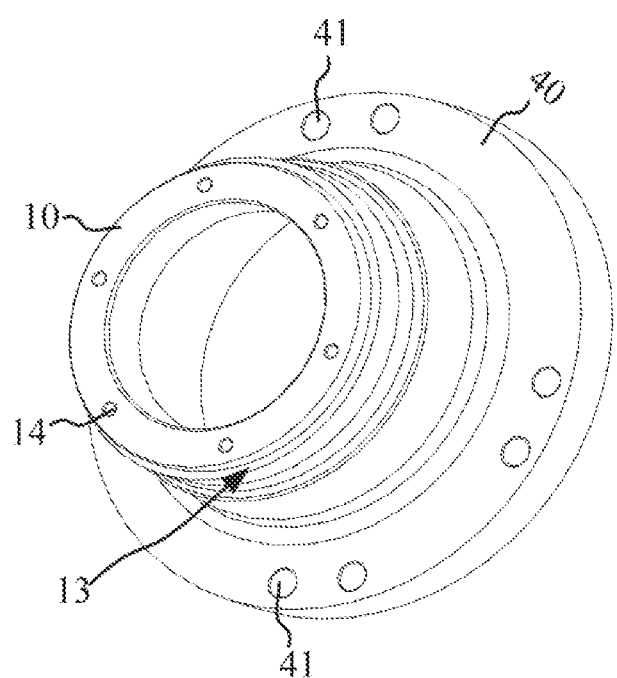
FIG. 4 illustrates a three-dimensional view of a bearing inner race of the rotary support according to an example aspect.

Referring to FIG. 3 and FIG. 4, a plurality of axially penetrated mounting holes 41 are disposed in outer ring 40, through holes 21 are disposed in bearing outer race 20, wherein through holes 21 match with mounting holes 41, annular groove 50 is disposed in an end of bearing outer race 20 opposite to outer ring 40, one opening of through hole 21 is communicated with the outside, and the other opening of through hole 21 is communicated with annular groove 50. By rotating bearing inner race 10 or bearing outer race 20, mounting holes 41 and through holes 21 can be aligned and communicated with each other, and mounting holes 41 are used for mounting the first mounting surface. In addition, referring to FIG. 2 as well, several threaded holes 22 arranged at intervals are disposed in an end of bearing outer race 20 away from outer ring 40, and threaded holes 22 are used for fixedly mounting the second mounting surface.

Figure 5:
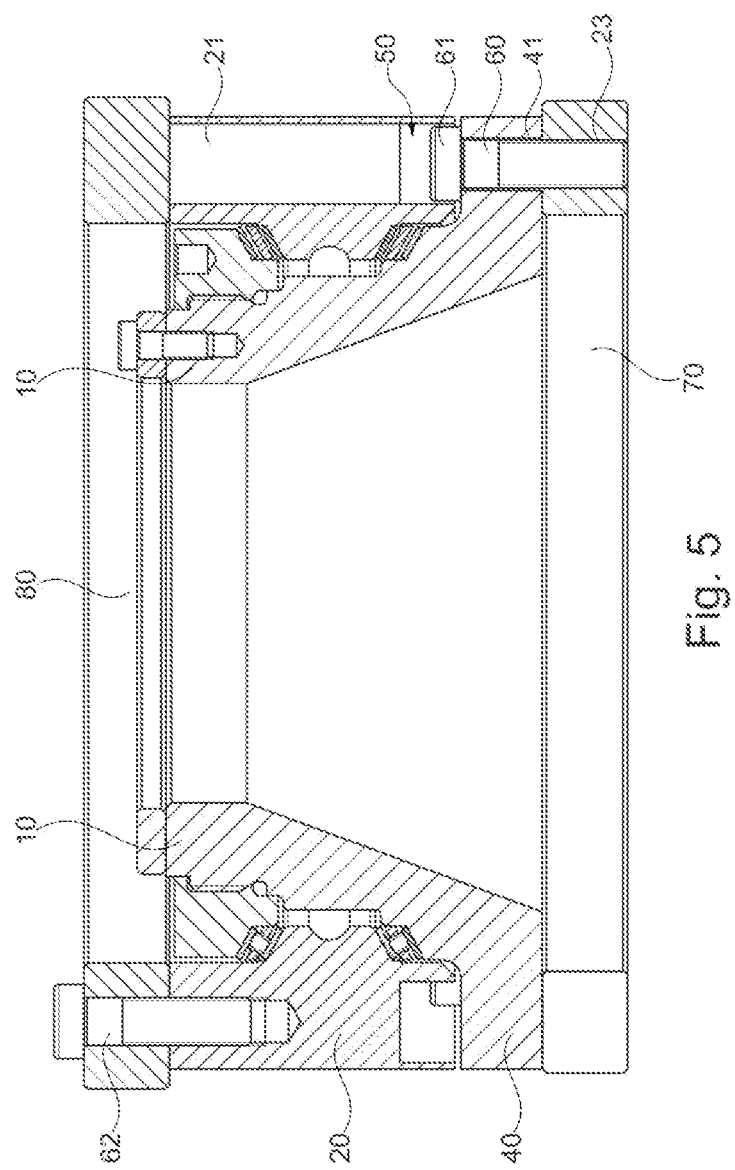
FIG. 5 illustrates a sectional view of the rotary support in a mounting state to a rotary structure along a plane parallel to a central axis according to an example aspect.

When the first mounting surface is to be mounted, bearing inner race 10 or bearing outer race 20 is rotated so that through holes 21 are aligned with mounting holes 41. Referring to FIG. 5, a rod of bolt 60 passes through through hole 21, annular groove 50, and mounting hole 41, and then is aligned with threaded hole 23 of first mounting surface 70, and then bolt head 61 is screwed, wherein bolt head 61 is located in annular groove 50, achieving the purpose of mounting outer ring 40 and first mounting surface 70. If first mounting surface 70 and outer ring 40 are desired to be dismounted, bolt 60 is removed through through hole 21. In an example aspect, a diameter of through hole 21 and a radial width of annular groove 50 are greater than a diameter of mounting hole 41, so as to allow bolt 60 to pass through. In addition, a second bolt 62 is in bolted connection with threaded hole 22 through the mounting hole of second mounting surface 80, achieving fixed connection between bearing outer race 20 and second mounting surface 80. Compared with the rotary support structure in the prior art, according to an example aspect, the mounting holes in the outer ring match or align with the through holes in the bearing outer race, achieving the purpose of fixedly connecting bearing inner race 10 and first mounting surface 70 in a direction pointing from bearing inner race 10 to first mounting surface 70, thereby effectively overcoming the limitation of narrow operating space around the first mounting surface. That is to say, when there is narrow operating space near first mounting surface 70, the two mounting surfaces can be fixedly connected to the rotary support in an opposite direction, i.e., the mounting direction of second mounting surface 80, overcoming any space limitation.

In an example aspect, the number and the arrangement of mounting holes 41 may follow a general rule, i.e., corresponding to the threaded holes of the first mounting surface. Generally, the number of mounting holes 41 is greater than four, and mounting holes 41 are of an even number and are arranged in central symmetry in outer ring 40. Referring to FIG. 4, in an example aspect, the number of mounting holes 41 is eight, each pair of two mounting holes 41 form one group, therefore in an example aspect, there are a total of four groups of mounting holes 41 in outer ring 40, and the four groups of mounting hole 41 are arranged at equal intervals; such arrangement is also well known to a person skilled in the art. In addition to such arrangement, each pair of mounting holes may have equal intervals between other pairs of neighboring mounting holes, which are arranged in central symmetry. To match mounting holes 41, in an example aspect referring to FIG. 2, the number of through holes 21 is two and through holes 21 are arranged at equal intervals. In mounting, through holes 21 are aligned with two mounting holes 41 at the same time, two bolts are put in through two through holes 21; then, two through holes 21 are aligned with the next two mounting holes 41, and two bolts are put into two mounting holes 41 respectively, until all mounting holes 41 have bolts installed. Afterwards, the bolts in the mounting holes 41 are screwed tight. First, two through holes 21 are aligned with two mounting holes 41, and meanwhile bolts in two mounting holes 41 are screwed symmetrically; then, two through holes 21 are aligned with the next two mounting holes 41, and meanwhile bolts in the two mounting holes 41 are screwed symmetrically, until bolts in all the mounting holes 41 are screwed tight. The purpose is to subject force to two mounting holes 41 symmetrical about the circle center simultaneously, thus avoiding tilting of outer ring 40 and potential damage to the rotary support due to force on only one mounting hole 41. Moreover, the force between outer ring 40 and the first mounting surface is distributed uniformly along the circumference of outer ring 40, ensuring more stable connection between outer ring 40 and the first mounting surface as well as long service life of the components. In addition, the number of through holes 21 is not limited to two, and may also be greater than two, and through holes 21 are of an even number and are arranged at equal intervals. In this way, there can be more through holes aligned with the mounting holes at the same time, for screwing and fixing using the bolts.

After the rotary support according to an example aspect is connected to the rotary structure, referring to FIG. 5, the rotary structure drives bearing inner race 10 to rotate relative to bearing outer race 20, and bolt head 61 is right in annular groove 50 and moves therein during the rotation. Annular groove 50 is set so that the radial width of annular groove 50 is greater than the diameter of the mounting hole and also greater than the maximum diameter of bolt head 61, preventing bolt head 61 from touching the end of bearing outer race 20, thereby avoiding interference with the relative rotation between bearing outer race 20 and bearing inner race 10, so as to ensure healthy operation of the equipment. In other example aspects, a large interval for accommodating the bolt head may also be set between opposite ends of bearing outer race 20 and outer ring 40, preventing the bolt head from touching the end of bearing outer race 20. Therefore, the above two solutions are feasible, except that the setting of the large interval occupies more operating space, while the setting of annular groove 50 does not change the overall contour of bearing outer race 20, and therefore does not occupy additional operating space.

In another example aspect, referring to FIG. 5, bearing inner race 10 and outer ring 40 are integrated, and first mounting surface 70 drives rotation of bearing inner race 10 through outer ring 40. In addition to being integrated, in other example aspects, outer ring 40 and bearing inner race 10 may be in threaded connection: an internal thread is disposed on an inner circumferential surface of outer ring 40, an external thread is disposed on an outer circumferential surface of bearing inner race 10, and the external thread can be screwed and fixed to the internal thread of outer ring 40, achieving the purpose of connecting outer ring 40 and bearing inner race 10. In other example aspects, bearing inner race 10 and outer ring 40 may also be in bolted connection.

In an example aspect, after the rotary support is connected to the rotary structure, the rotary support further needs to be connected to some pipe bundles or lines, to realize positional movement of other components. In an example aspect, to arrange more pipelines or wire bundles in the hollow space of bearing inner race 10, referring to FIG. 3, an inner diameter of bearing inner race 10 gradually increases in a direction pointing from bearing outer race 20 to outer ring 40. Such setting increases the hollow space of bearing inner race 10, so that it is more convenient to arrange more pipelines or wire bundles in the hollow space, and the material of bearing inner race 10 is reduced, thereby lowering cost.

In an example aspect, bearing inner race 10 and bearing outer race 20 rotate relative to each other through the rolling elements. Referring to FIG. 3, rolling elements 30 are located in retainers 31 between bearing inner race 10 and bearing outer race 20 and are spaced apart from each other. Moreover, multiple rolling elements 30 according to an example aspect include two sets of angular contact thrust bearings. Specifically, the rotary support of the present invention further includes screw race 12 located between bearing inner race 10 and bearing outer race 20, wherein screw race 12 radially surrounds bearing inner race 10 and is in threaded connection with bearing inner race 10, and the sets of rolling elements 30 are located between outer ring 40 and screw race 12. Screw race 12 and bearing outer race 20 provide a pair of rollways for one group of rolling elements. Screw race 12 not only provides rollways for the rolling elements, but also pre-tightens the rolling elements, ensuring smooth sliding between the rolling elements and the rollways and ensuring that the rolling elements do not depart from the rollways.

In an example aspect, the rotary support further includes a positioning device and a limiting device. Referring to FIG. 3, axial threaded holes 14 are disposed in an end of bearing inner race 10 away from outer ring 40, and threaded holes 14 are connected to a peripheral braking system through corresponding screws, realizing rotation stopping and positioning of the rotary support. Still referring to FIG. 3, multiple first spherical grooves (not shown) arranged at intervals are disposed, surrounding bearing inner race 10, on the outer circumferential surface of bearing inner race 10 between two rows of rolling elements, two steel balls are disposed in each first spherical groove, and the steel balk can roll in the first spherical grooves. Second spherical grooves are disposed on the inner circumferential surface of bearing outer race 20 radially opposite to the first spherical grooves, and the second spherical grooves are used for preventing the steel balls from touching the inner circumferential surface of the bearing outer race 20. Limiting screw holes radially communicated with the second spherical grooves are disposed in the bearing outer race 20. On one hand, the limiting screw holes can be used for filling lubricating grease to facilitate lubrication of the rotary support. On the other hand, the limiting screw holes together with the steel balk firm a stroke limiting device. When a limiting screw in the limiting screw hole is located between two steel balls in a certain spherical groove, the rotation stroke of the rotary support can be limited, thereby achieving the purpose of position limiting, for example, achieving a relative rotation angle between the bearing inner race and the bearing outer race of 90 degrees or 270 degrees.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

I claim:

1. A rotary support, comprising:
    a bearing inner race;
    a bearing outer race including a plurality of axially disposed through holes;
    a first plurality of rolling elements installed between the bearing inner race and the bearing outer race, and arranged to retain the bearing inner race and the bearing outer race in rolling engagement; and
    an outer ring radially surrounding and fixed to an outer portion of the bearing inner race and disposed axially opposite to the bearing outer race; wherein the outer ring includes a plurality of axially penetrated mounting holes; wherein the bearing outer race through holes are axially aligned with the outer ring mounting holes; and
    a screw race disposed between the bearing inner race and the bearing outer race; wherein the screw race radially surrounds the bearing inner race and is in threaded connection with the bearing inner race.

2. The rotary support of claim 1, wherein an annular groove is disposed in an end of the bearing outer race axially opposite to the outer ring, and a radial width of the annular groove is greater than a diameter of the mounting holes.

3. The rotary support of claim 1 further comprising a second plurality of rolling elements installed between the screw race and the outer race and arranged for rolling engagement between the screw race and the outer race.

4. The rotary support of claim 3, wherein an annular groove is disposed in an end of the bearing outer race axially opposite to the outer ring, and a radial width of the annular groove is greater than a diameter of the mounting holes.

5. The rotary support of claim 1, wherein an inner diameter of the bearing inner race gradually increases in axial direction pointing from the bearing outer race to the outer ring.

6. A rotary support, comprising:
a bearing inner race,
a bearing outer race, and
a plurality of rolling elements installed between the bearing inner race and the bearing outer race and arranged to retain the bearing inner race and the bearing outer race in rolling engagement;
a first mounting surface, wherein the bearing inner race includes at least two mounting holes for mounting the first mounting surface, and
a second mounting surface, wherein the bearing outer race includes at least two threaded holes for mounting the second mounting surface; and,
wherein the bearing outer race further includes at least two through holes axially aligned with the mounting holes, so that the bearing inner race is fixedly connected to the first mounting surface in a direction pointing from the bearing inner race to the first mounting surface;
wherein the bearing inner race comprises a main body and an outer ring surrounding the main body in a radial direction and connected to the main body, wherein the outer ring is axially opposite to the bearing outer race, and the at least two mounting holes are disposed in the outer ring and are axially penetrated.

7. The rotary support of claim 6, wherein an annular groove s disposed in an end of the bearing outer race axially opposite to the outer ring, and a radial width of the annular groove is greater than a diameter of the mounting holes.

8. The rotary support of claim 6 further comprising a screw race disposed between the bearing inner race and the bearing outer race; wherein the screw race radially surrounds the bearing inner race and is in threaded connection with the bearing inner race.

9. The rotary support of claim 8 further comprising a second plurality of rolling elements installed between the screw race and the outer race and arranged for rolling engagement between the screw race and the outer race.

10. The rotary support of claim 6, wherein an inner diameter of the bearing inner race gradually increases in axial direction pointing from the bearing outer race to the outer ring.

* * * * *